(No Model.)
W. C. SALMON.
COFFEE BOILER.
No. 264,480. Patented Sept. 19, 1882.
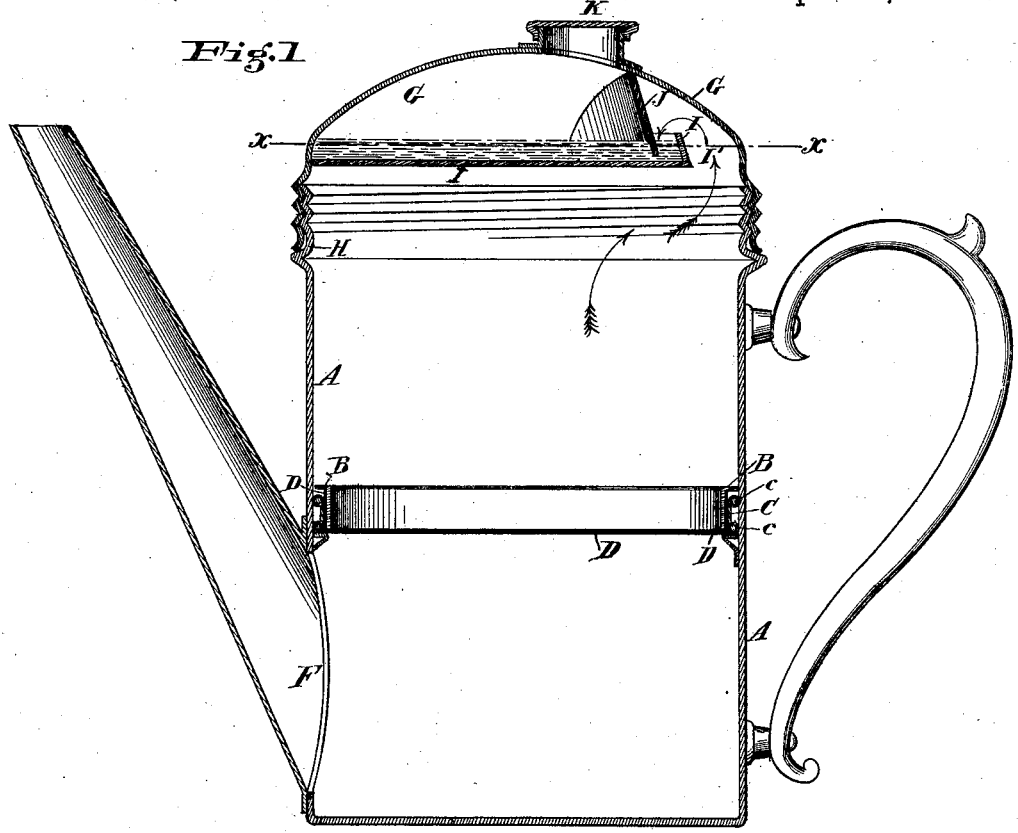
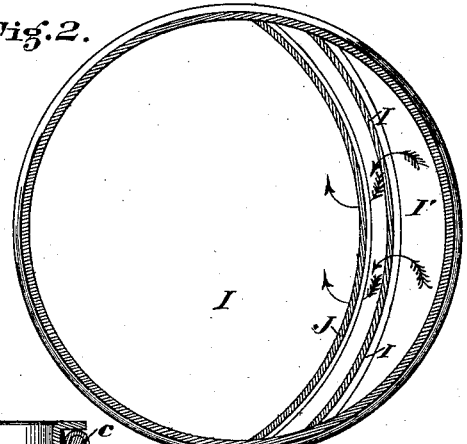
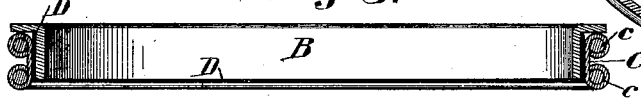
Attest
Gus A. Meyer
Charles E. Brown
Inventor
William C. Salmon,
by Stem & Peck,
his Attys.

UNITED STATES PATENT OFFICE.

WILLIAM C. SALMON, OF CINCINNATI, OHIO, ASSIGNOR OF ONE-HALF TO HENRY KASSON, OF COVINGTON, KENTUCKY.

COFFEE-BOILER.

SPECIFICATION forming part of Letters Patent No. 264,480, dated September 19, 1882.

Application filed April 26, 1882. (No model.)

*To all whom it may concern:*

Be it known that I, WILLIAM C. SALMON, a citizen of the United States, residing at Cincinnati, Hamilton county, Ohio, have invented a new and useful Improvement in Coffee-Boilers, of which the following is a specification.

In the accompanying drawings, Figure 1 is a vertical section of the improved coffee-boiler. Fig. 2 is a horizontal section of the top, showing the water and steam escape; Fig. 3, a side view of the pan or diaphragm for the ground coffee.

The object of the invention is to prevent the fumes of the coffee escaping while it is being boiled and to preserve the aroma and strength of the coffee, which would otherwise escape with the vapors and steam, and to secure a more perfect extraction of the essence of the coffee.

The coffee-boiler A may be made of any desirable form or shape, and is provided at a suitable point between the bottom and top, above the spout F, with a diaphragm, either of muslin or other suitable material, for holding the ground coffee; or, if preferred, the diaphragm may be placed below the top of the tube F if the opening into the tube above the diaphragm is provided with a strainer. This diaphragm may either be made, as shown in the drawings, of two bands, one fitting around the other and inclosing the edges of the piece of muslin or other suitable material, and fitting tightly against the inner walls of the boiler, or supported by lugs on the inside of the walls; or the muslin may be stretched over a band in any convenient manner and supported on legs which stand on the bottom of the boiler.

In the drawings, the band B is a simple band of sheet metal flanged at its upper edge, the flange fitting snugly against the sides of the coffee-boiler. The band C consists of a piece of sheet metal, its upper and lower edges flanged and rolled around a fillet of wire, *c c*, a piece of muslin or wire cloth (shown by the dark line D) being stretched over the ring B, holding the cloth tightly between the two bands, like an old-fashioned milk-strainer. The ground coffee being placed in the strainer or diaphragm, the boiling water comes in contact with it from all sides more completely than if it were laid on the bottom of the boiler, and the essence of the coffee is more completely extracted; and this diaphragm being above the opening of the spout F or below it, as before mentioned, none of the grounds can escape through the spout when the coffee is poured out.

The top of the coffee-pot, which may be attached in the ordinary way or screwed on, as shown in the drawings, is made to fit tightly to prevent the escape of steam. This top is provided with a pan, I, extending over almost its entire width, as shown in Figs. 1 and 3, leaving only a narrow space or opening, I'. This pan I is filled with water, and from the under side of the top extends downward nearly to the bottom of the pan a division-wall or shield, J, by which the coffee-pot is sealed, and so arranged that the steam and vapors arising from the boiling coffee must pass over the edge of the pan I and through water under the shield J, as indicated by the arrow, before they can escape through the opening K. The steam thus forced through the water is almost entirely condensed and will drip back into the boiler over the edge of the pan I, the aroma of the coffee and the essence carried up by the vapors is preserved, the steam or vapors escaping through K being free from any odor, and the coffee made by this process being consequently much richer and of finer quality than when made in the ordinary way.

Any escape of steam or vapor through the spout F may be prevented by either the well-known device of a cap or valve.

Of course this boiler may be used for making chocolate, tea, or for any similar purpose, and the sealed lid or top may also be applied to vessels in which vegetables or meat are being boiled or stewed.

Having described my invention, what I claim as new, and desire to secure by Letters Patent, is—

The combination, with the coffee-boiler having the pervious diaphragm to hold the ground coffee at a suitable point above the pouring-spout, of the top G, tightly secured to the boiler, and having the water-pan I, formed with a turned-up ledge at the rear of the division-wall J, located at the rear in proximity to the rear ledge of the water-pan and extending down from the top proper nearly to the bottom of the pan, and the capped opening K, through which liquid may be poured to fill the pan, the whole being constructed and arranged so that when the contents of the boiler are boiled the steam and vapor arising will pass up through the space I' at the rear of the top, and thence into the liquid in the pan, where, becoming condensed, it will drip back into the body of the boiler again, and when the boiler is tipped to pour off the liquid through the spout the liquid contents of the pan will flow to the front without being allowed to escape into the boiler below, substantially as described.

WM. C. SALMON.

Witnesses:
WILL W. ADAMS,
B. F. KEFFER.